United States Patent
Miyamura

(10) Patent No.: US 12,087,331 B2
(45) Date of Patent: Sep. 10, 2024

(54) RETAINING HIGH RESOLUTION TAPE DIRECTORY IN OVERWRITTEN END OF DATA SET

(71) Applicant: International Business Machines Corporation, Armonk, NY (US)

(72) Inventor: Tsuyoshi Miyamura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/067,833

(22) Filed: Dec. 19, 2022

(65) Prior Publication Data

US 2024/0203459 A1    Jun. 20, 2024

(51) Int. Cl.
  G11B 27/10    (2006.01)
  G11B 27/028   (2006.01)

(52) U.S. Cl.
  CPC ......... G11B 27/107 (2013.01); G11B 27/028 (2013.01); G11B 2220/93 (2013.01)

(58) Field of Classification Search
  None
  See application file for complete search history.

(56) References Cited

U.S. PATENT DOCUMENTS

| | | | |
|---|---|---|---|
| 6,307,700 B1 * | 10/2001 | Takayama | G11B 27/11 |
| 8,364,955 B1 * | 1/2013 | Sharma | G06F 21/6218 |
| | | | 713/193 |
| 10,818,314 B1 * | 10/2020 | Miyamura | G11B 5/00813 |
| 11,056,140 B1 * | 7/2021 | Miyamura | G06F 3/064 |
| 2005/0207221 A1 | 9/2005 | Bartlett et al. | |
| 2005/0223162 A1 * | 10/2005 | Evans | G11B 23/36 |
| | | | 711/111 |
| 2005/0235103 A1 * | 10/2005 | Saliba | G03C 1/015 |
| 2007/0079059 A1 | 4/2007 | Itagaki et al. | |
| 2007/0291391 A1 | 12/2007 | Gill et al. | |
| 2012/0173833 A1 * | 7/2012 | Lehr | G06F 12/08 |
| | | | 711/E12.002 |
| 2012/0284456 A1 | 11/2012 | Masuda et al. | |
| 2014/0053529 A1 * | 2/2014 | Allam | F01K 25/103 |
| | | | 60/726 |
| 2014/0108720 A1 * | 4/2014 | Abe | G06F 3/0682 |
| | | | 711/111 |

(Continued)

FOREIGN PATENT DOCUMENTS

| | | |
|---|---|---|
| CN | 101162599 A | 4/2008 |
| CN | 103080896 A | 5/2013 |

(Continued)

OTHER PUBLICATIONS

IBM, "Data safe (append-only) mode," https://www.ibm.com/docs/en/ts4300-tape-library?topic=features-data-safe-append-only-mode, last updated Mar. 22, 2022, 2 pgs.

(Continued)

Primary Examiner — Fred Tzeng
(74) Attorney, Agent, or Firm — Scott S. Dobson

(57) ABSTRACT

An End of Data Set (EOD) including a High Resolution Tape Directory (HRTD) is written at a position next to a last written user data set on a tape. When appending a new user data set, the new user data set is written starting from a position next to an end longitudinal position (LPOS) of the EOD to generate an overwritten EOD.

20 Claims, 6 Drawing Sheets

(56) References Cited

U.S. PATENT DOCUMENTS

| | | | | |
|---|---|---|---|---|
| 2014/0226236 A1* | 8/2014 | Shiratori | ............... | G06F 3/0611 |
| | | | | 360/75 |
| 2015/0058696 A1 | 2/2015 | Cideciyan et al. | | |
| 2016/0329079 A1* | 11/2016 | Abe | ...................... | G06F 3/0644 |
| 2018/0053529 A1* | 2/2018 | Abe | ..................... | G11B 27/328 |
| 2022/0358967 A1* | 11/2022 | Miyamura | ............ | G06F 3/0644 |
| 2023/0097031 A1* | 3/2023 | Yamamoto | ............ | G06F 3/0686 |
| | | | | 711/154 |

FOREIGN PATENT DOCUMENTS

| | | |
|---|---|---|
| CN | 103680520 A | 3/2014 |
| EP | 0942427 B1 | 6/2012 |

OTHER PUBLICATIONS

International Search Report, International Application No. PCT/CN2023/134211, Dec. 23, 2023, 8 pgs.

* cited by examiner

RETAINING HIGH RESOLUTION TAPE DIRECTORY IN OVERWRITTEN END OF DATA SET

BACKGROUND

The present disclosure relates to tape data storage, and more specifically, to non-volatile storage of High Resolution Tape Directory (HRTD) for a tape cartridge.

Linear tape-open (LTO) tape drives and IBM enterprise tape drives (TS11xx) are called linear tape drives. A linear tape drive allocates data on a tape in a longitudinal direction and records the data from the beginning of the tape to the end, then shifts the position slightly in the lateral direction of the tape, and then records data to the tape in the opposite longitudinal direction. The linear tape drive repeats this reciprocating operation several times with shifting in the lateral direction of the tape.

A host issues a reposition request by the order of record number or file mark number. Here file mark is a delimitor of a group of records making up a file. As the tape drive cannot determine where the target record or file mark is written on the tape, the drive roughly determines the location by using a Tape Directory (TD). TD for LTO tape drive divides a wrap into two regions whereas High Resolution Tape Drive (HRTD) for TS11xx tape drive divides a wrap into 128 regions. For example, as TS1160 has 272 wraps, it has 272 wraps×128 regions/wrap=34816 regions. The TD and HRTD record the last written record number and file mark number of the region and also record the number of records and file marks written in the region. This information enables the tape drive to determine whether the target record or file mark is in the region.

The tape drive refers to the HRTD expanded in the main memory on reposition. When the tape cartridge is ejected from the tape drive, the HRTD may be written in a non-volatile memory in the tape cartridge for restoring the HRTD at the next loading of the tape cartridge. As the size of TD is small, it can be stored in the cartridge memory (CM) of the tape cartridge. However, the HRTD cannot be recorded in CM due to its size.

SUMMARY

According to embodiments of the present disclosure, a method is provided. The method includes writing, at a position next to a last written user data set on a tape, an End of Data Set (EOD) including a High Resolution Tape Directory (HRTD). The method further includes writing, when appending a new user data set, the new user data set starting from a position next to an end longitudinal position (LPOS) of the EOD to generate an overwritten EOD.

Further embodiments of the present disclosure provide a tape drive and a computer program product for performing the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
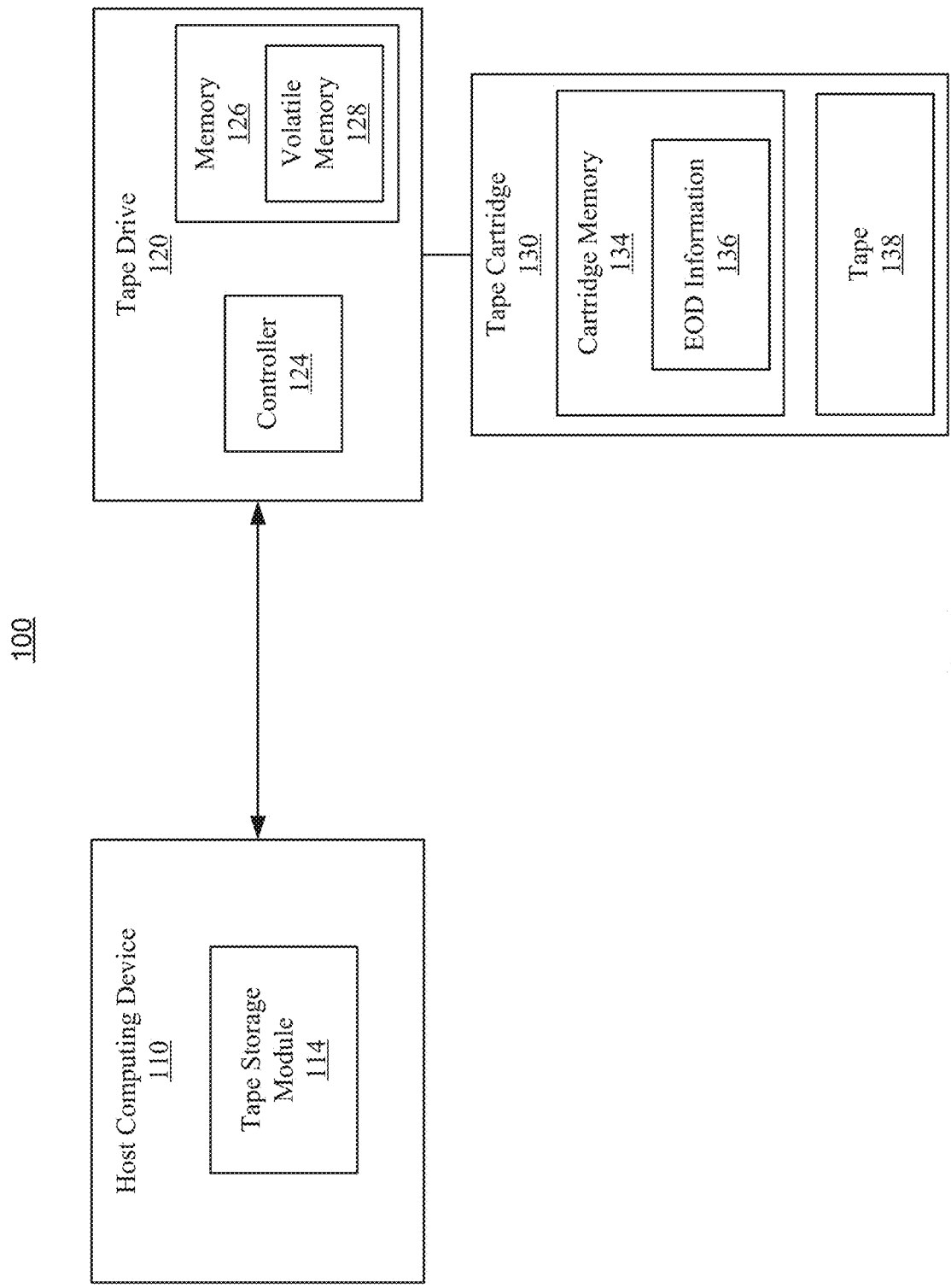
FIG. 1 depicts a block diagram of a tape storage system, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to high resolution tape directory in tape storage, and more particular aspects relate to retaining high resolution tape directory in an end of data set on tape when appending new user data sets. While the present disclosure is not necessarily limited to such applications, various aspects of the disclosure may be appreciated through a discussion of various examples using this context.

The data area of the tape is divided into multiple areas called wraps. Tape drives write data to the tape on each wrap linearly from the beginning of the tape to the end, or from the end of the tape to the beginning. The width of valid data area of each wrap in tape width direction is called track pitch. For example, a tape drive may record data with even wraps being written from the beginning of the tape to the end of the tape and odd wraps being written from the end of the tape to the beginning of the tape. The TS1160 has 68 wraps on each data band and a total of 272 wraps on the tape. The user data which is sent from the host is written to the tape in units of a data set from beginning of a wrap to the end of a wrap. A Data Set Information Table (DSIT), which records the information of the data set, is written as a part of the data set.

Tape drives write data from the beginning of the tape to the end of it, which is also known as a sequential device. A record is the unit that a host writes data to the tape drive. The records that are written to the tape drive are compressed by a compression engine of the tape drive and stored on a memory buffer temporarily. Once the compressed data size exceeds a data set size, the tape drive writes the data to the tape by a unit of a data set. At the end of user data sets, the drive writes a special type of data set called an End of Data Set (EOD) to indicate that there is no further data set on the tape. The physical position of the EOD is recorded in the non-volatile memory, called cartridge memory (CM), embedded on the cartridge, so the tape drive can navigate to the location of the EOD to append new user data to the tape.

There are two kinds of ID that are used to identify a data set. One is a data set ID whose value is set to 1 at the beginning of the tape (BOT) and increases by 1 for each data set. The other is a Tape Write Pass whose value is set to 1 when shipped and increases by 1 when an old data set is overwritten. The Tape Write Pass is never cleared to ensure that latest data set has the largest value among older data sets. When the drive reads new and old data set fragments, it can pick the latest fragments only using Tape Write Pass.

The tape drive must navigate to the physical location of the data set to read or overwrite before it starts reading or writing data sets from the tape. The operation of adjusting the location is called reposition.

The host issues a reposition request using record number or file mark number. A file mark is an indicator of a group of records which make up a file. As the tape drive cannot determine where the target record or file mark is written on the tape, the drive roughly determines the location by using a Tape Directory (TD). TD for LTO tape drive divides a wrap into two regions, whereas High Resolution Tape Drive (HRTD) for TS11xx tape drives divides a wrap into 128 regions. For example, as TS1160 has 272 wraps, it has 272 wraps×128 regions/wrap=34816 regions. TD and HRTD record the last written record number and file mark number of the previous region, and also record the number of records and file marks written in the region. This information enables the tape drive to determine whether the target record or file mark is in the region.

The tape drive identifies the region of the target record or the target file mark when it receives a reposition request from the host. As the physical location of the region is identified uniquely, the drive can reposition to the beginning of the region and read each data set one by one from the first one in the region until it finds the data set which contains the target record or file mark.

The tape drive refers to the HRTD in the main, volatile memory when repositioning. When the tape cartridge is ejected from the tape drive, the HRTD must be written in a non-volatile memory to be used for the next loading of the tape cartridge. As the size of TD is small, it can be stored in the CM of the cartridge. However, the HRTD cannot be recorded in CM due its size. Instead, the tape drive may write HRTD on the tape at a location where user data is not written. It may be difficult to read back the HRTD depending upon the tape media or the drive head conditions, thus the tape drive may record the HRTD in several locations on the tape and recover the HRTD as follows:

(1) The HRTD may be recorded in the housekeeping area as a part of the standard housekeeping data set (sHKDS). sHKDS is recorded in the housekeeping area which is located before the user data area and is read first when a cartridge is loaded into the tape drive. For a user data set, the tape drive attempts to read repeatedly up to 80 times by changing the settings when the user data set cannot be read, which is called Error Recovery Procedures (ERPs). The drive reports the error to the host if the data set cannot be read back after ERPs. On the other hand, the drive stops reading sHKDS with fewer attempts because sHKDS is not a user data and the drive can keep working without it.

(2) The tape drive may write the HRTD in the EOD next to the user data set that indicates the end of user data. Since the size of EOD is the same as a normal data set but the EOD mark size is very small, the drive records the sHKDS information in the remaining space. If, the tape drive fails to retrieve the HRTD by reading the sHKDS on loading the tape cartridge, the tape drive can retrieve HRTD by navigating to the EOD when it receives a reposition request from the host. Unfortunately, the drive cannot retrieve HRTD from EOD as it doesn't exist if it failed to write user data set.

(3) The tape drive may record the HRTD in a null data set at the beginning of wraps (BOW). The null data set does not record any user data. Since the drive turns to the next wrap at BOW, magnetic debris accumulate at the location. The tape condition at BOW becomes worse than other areas which prevents the tape drive from reading back the HRTD at BOW. Additionally, as the null data set is not a user data set, the tape drive will not attempt to write it multiple times if it fails to write, to maintain the write performance. This results in an unrecoverable HRTD.

(4) DSIT records not only the data set information like DS ID or record number, but also HRTD of two regions due to the limitation of its size. As TS1160 has 34816 regions in HRTD, the drive reads 17408 data sets to recover the HRTD which are written on the tape at least 2.4 wraps or more. If the drive/tape conditions are good, it may take at least 7 minutes to retrieve them.

(5) If the tape drive cannot recover HRTD by reading DSIT, the tape drive can recover it by reading whole data sets on the tape as a last resort, which may take more than 14 hours.

The tape drive can overwrite new records on an existing record location, which is called append. Append starts writing new data sets from the end longitudinal position (LPOS) of the last data set of the overwritten data set. By writing from the location immediately, the old data is completely overwritten so that old data cannot be read mistakenly. But if the tape drive's head is degraded by the usage, or if magnetic debris accumulate on the tape surface, the drive may be unable to position the write head on track correctly. In this case, the drive stops writing until the head is correctly positioned on the track. The drive keeps running without writing on the tape to adjust the head position until it is on track. The drive can read back the new data set even when it was written at a later location than the older data set by comparing the Tape Write Pass to that of the previous data set. However, append data set does not have any previous data set with the same Tape Write Pass. In order to avoid this situation, the tape drive needs to append from the end LPOS of the previous data set.

When the tape medium is worn out or has accumulated debris, the drive may be unable to follow on the track at the end LPOS of the previous data set. Despite multiple write attempts, if the tape drive cannot start writing from the end LPOS position, the drive enters a Suspended Append Write (SAW) mode. The tape drive records the data set ID and Tape Write Pass in CM, and then it writes the data set at a location away from the end LPOS of the previous data set. Whenever the tape drive reads a data set, it checks CM to determine whether the data set was overwritten by SAW. If so, the drive discards the older data set and attempts read again with the Tape Write Pass.

Figure 2:
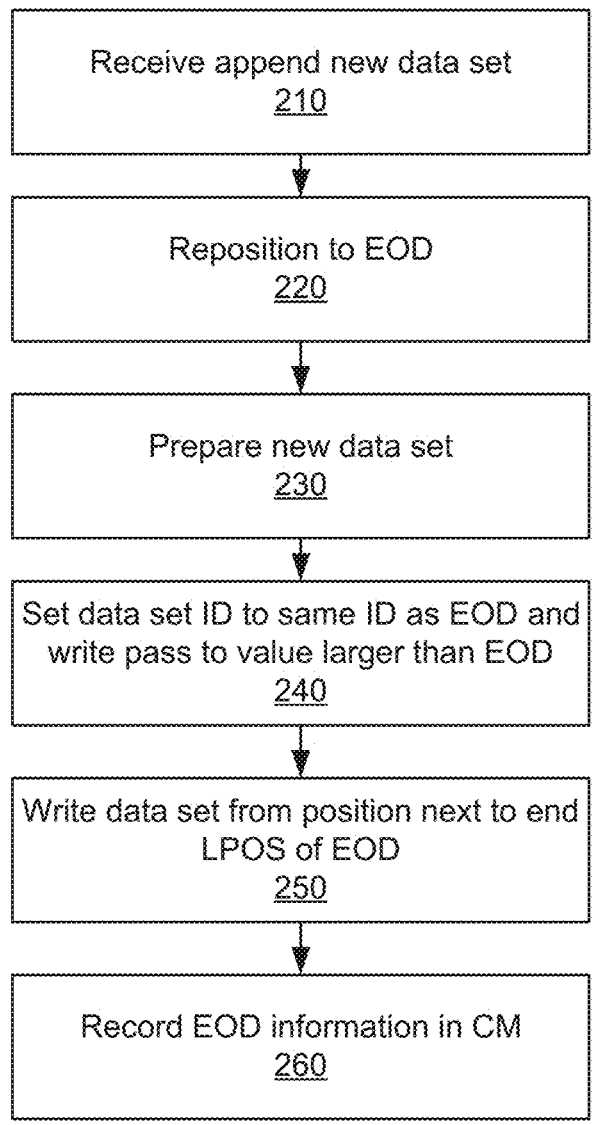
FIG. 2 depicts a flowchart of an example method for appending a new data set, according to embodiments.

When the tape drive appends a new data set from EOD, it repositions to the EOD location and overwrites a new data set from there as depicted in FIG. 2. If the drive cannot start writing the data set at the location, it writes the data set by SAW without recording the data set ID and Tape Write Pass in CM, unlike a normal append case. The drive can distinguish whether the EOD is real or overwritten by another data set by checking the EOD information page in CM which records the EOD data set ID and its Tape Write Pass. This also saves the capacity of SAW page in CM.

The tape drive recovers the HRTD when a reposition command is issued because it takes long time to reposition without the HRTD if it cannot be retrieved from sHKDS on loading the cartridge. The tape drive currently recovers HRTD using one of the 5 mechanisms described herein. As the EOD may record more HRTD information than other mechanisms and the time to read may be shorter than others, the tape drive may recover the HRTD using EOD at highest priority. However, the drive cannot utilize the EOD when it is not written on the tape due to write failure or powering down during the writing of data. The HRTD may be recorded in a null data set at BOW of each wrap, but BOW gets worn out faster because of unexpected friction by wrap turn at the location. Reading BOW data may fail or take long time for ERPs. The null data set at BOW is not always written when ERP occurs on writing.

According to embodiments of the present disclosure, a mechanism for writing an append data set by tape drives to preserve the HRTD in the EOD is provided. When appending new data to a tape, the proposed mechanism processes an append data set by writing from a position next to the end LPOS of the EOD without physically overwriting EOD. This EOD may be considered as overwritten by SAW. The new data set may be given a tape write pass whose value is greater than that of the overwritten EOD. Information for locating the EOD overwritten by SAW may be stored in the CM of the tape cartridge. This allows the tape drive to recover the HRTD from the EOD overwritten by SAW which is written within the user data area that is generally in better condition than BOW.

Referring now to FIG. 1, a block diagram of a tape storage system 100 is depicted according to embodiments of the present disclosure. Tape storage system 100 includes a host computing device 110, a tape drive 120, and a tape cartridge 130. The host computing device 110 may be communicatively coupled to tape drive 120 via one or more interfaces. In some embodiments, host computing device 110 may communicate with tape drive 120 over one or more networks. Although not depicted, in some embodiments, tape drive 120 may be part of a tape library having a plurality of tape drives Host computing device 110 may be any suitable computing. Host computing device 110 includes a tape storage module 114. Tape storage module 114 may be any combination of hardware and software components configured to communicate with tape drive 120. For example, tape storage module 114 may include program instructions executable by a processor for communicating commands to tape drive 120 and processing information received from tape drive 120.

Tape drive 120 may be any type of suitable tape drive. Tape drive 120 may include a controller 124. Controller 124 may be or include a processor and/or any logic for controlling any subsystem of tape drive 120. For example, controller 124 typically controls head functions such as servo following, data writing, data reading, etc. The controller 124 may operate under logic known in the art, as well as any logic disclosed herein, and thus may be considered as a processor for any of the descriptions of tape drives included herein, in various embodiments. The controller 124 may be coupled to a memory 126 of any known type, which may store instructions executable by the controller 124. Moreover, the controller 124 may be configured and/or programmable to perform or control some or all of the methodology presented herein. Thus, the controller 124 may be considered to be configured to perform various operations by way of logic programmed into one or more chips, modules, and/or blocks; software, firmware, and/or other instructions being available to one or more processors; etc., and combinations thereof.

Memory 126 may be a combination of one or more memory devices. Memory 126 includes volatile memory 128. Controller 124 may be configured to store information in volatile memory 128 related to a tape cartridge that is loaded in tape drive 120. For example, the controller may store an HRTD in volatile memory 128 for use in executing a reposition request from the host.

Tape cartridge 130 may be loaded in tape drive 120. Tape cartridge 130 may be any suitable type of tape cartridge. Tape cartridge 130 may include cartridge memory 134 and tape 138. Cartridge memory 134 may store EOD information 136 as described herein.

Referring now to FIG. 2, a flowchart of an example method 200 for appending a new data set is depicted, according to embodiments. Method 200 is described herein in reference to tape drive 120 in tape storage system 100 of FIG. 1, but it is to be understood that other suitable tape drives and tape storage systems may perform method 200 in other embodiments.

At operation 210, the tape drive 120 receives an append new data set command from host computing device 110. At operation 220, tape drive 120 repositions the tape head to the end LPOS of the EOD on tape 138. The position of the EOD may be determined by reading EOD information 136 in CM 134. At operation 230, tape drive 120 prepares the new data set. For example, the tape drive may compress data received from the host. At operation 240, tape drive 120 sets the data set ID for the new data set to the same data set ID as the EOD and sets the tape write pass to a value larger than the tape write pass value of the EOD. For example, the tape write pass may be an integer and the tape write pass value may be incremented by 1 for the new data set compared to the tape write pass value of the EOD. At operation 250, tape drive 120 writes the new data set to tape 138 from the position next to the end LPOS of the EOD. The tape drive writes the new data set with the data set ID and tape write pass value set in operation 240. At operation 260, tape drive 120 records information for locating the overwritten EOD in CM 134 of tape cartridge 130. The information recorded for locating the overwritten EOD may include the data set ID, tape write pass, wrap in which the EOD was recorded, and beginning LPOS of the EOD.

As the new data set is written at a point later than the end LPOS of the previous user data set, the EOD may be considered overwritten by SAW. However, since the EOD overwritten by SAW is not physically overwritten and the information for locating the overwritten EOD is stored in the CM, the HRTD stored in the overwritten EOD may be retrieved as discussed herein in reference to FIG. 5.

Figure 3:
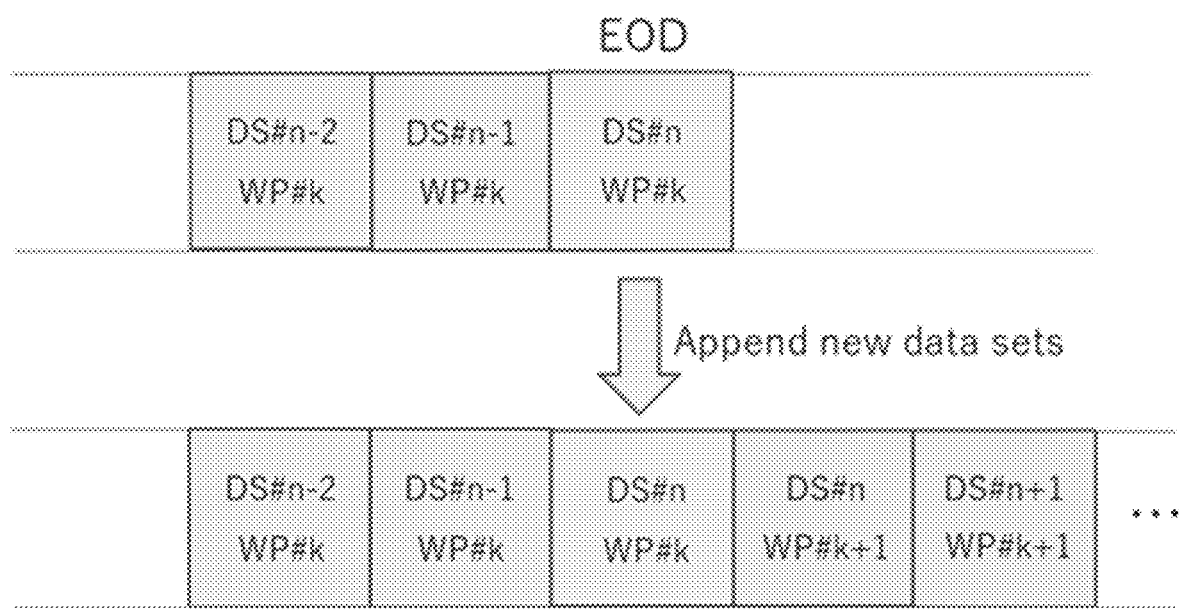
FIG. 3 depicts data sets in a wrap to show the appending of new data sets at EOD according to the method depicted in FIG. 2.

Referring now to FIG. 3, data sets in a wrap are depicted to show the appending of new data sets at EOD according to method 200. FIG. 3 shows a wrap with data sets before an append operation and the same wrap after an append operation. As depicted, the new data sets are written at a position next to the end LPOS of the EOD so that the EOD is not physically overwritten. Thus, the EOD may still be read from the tape even though it has been overwritten by SAW. As depicted, the first new data set has the same data set ID (DS #n) as the EOD, but has an incremented tape write pass value (WP #k+1).

Figure 4:
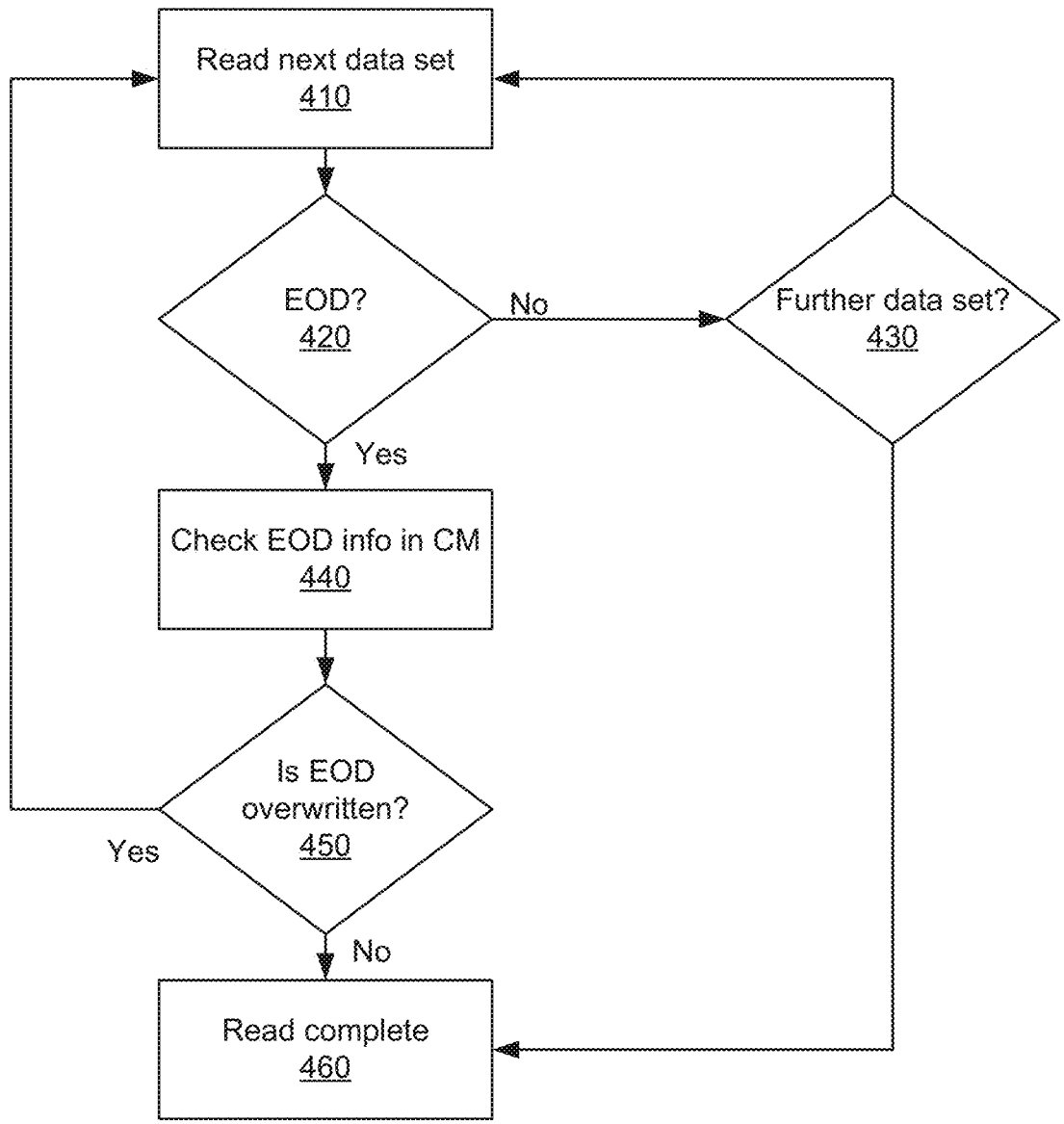
FIG. 4 depicts a flowchart of an example method for reading data sets from tape, according to embodiments.

Referring to FIG. 4, a flowchart of an example method 400 for reading data sets from tape is depicted according to embodiments. Method 400 is described herein in reference to tape drive 120 in tape storage system 100 of FIG. 1, but it is to be understood that other suitable tape drives and tape storage systems may perform method 400 in other embodiments.

At operation 410, tape drive 120 reads a data set from tape 138. At operation 420, tape drive 120 determines whether the data set is an EOD. If the data set is an EOD, the tape drive 120 checks the EOD information stored in CM 134. In some embodiments, the tape drive checks the information on the current EOD to see if it matches information on the read EOD. In some embodiments, the tape drive checks the information on an EOD overwritten by SAW stored in the CM to see if it matches the read EOD. The information checked may include data set ID, tape write pass, wrap where the EOD was written, and LPOS for the EOD.

At operation 450, tape drive 120 determines whether the read EOD was overwritten by SAW based on the EOD information read from CM 134. If the EOD has not been overwritten by SAW, the tape drive determines that the read is complete at operation 460. If the EOD has been overwritten by SAW, tape drive 120 restarts reading a data set, at operation 410, from the same position by incrementing the tape write pass value at operation.

If, at operation 420, tape drive 120 determines that the data set is not an EOD, tape drive 120 determines whether there is a further data set to be read at operation 430. If there is a further data set to be read, tape drive 120 reads the next data set at operation 410. If there is no further data set to be read, tape drive 120 determines that the read is complete at operation 460.

Figure 5:
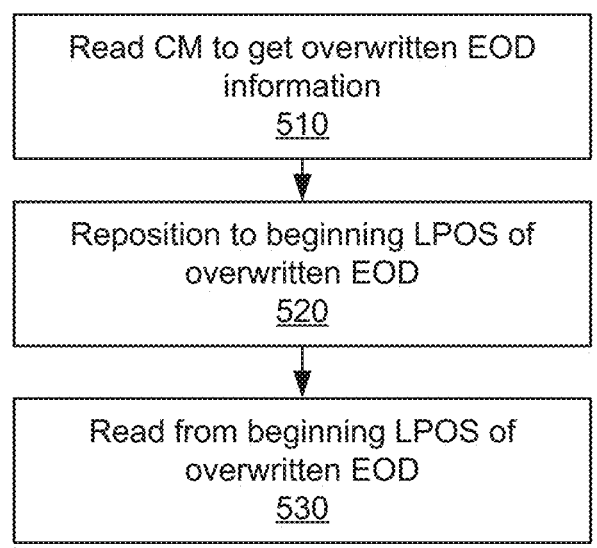
FIG. 5 depicts a flowchart of an example method for restoring an HRTD using an EOD overwritten by SAW, according to embodiments.
Figure 6:
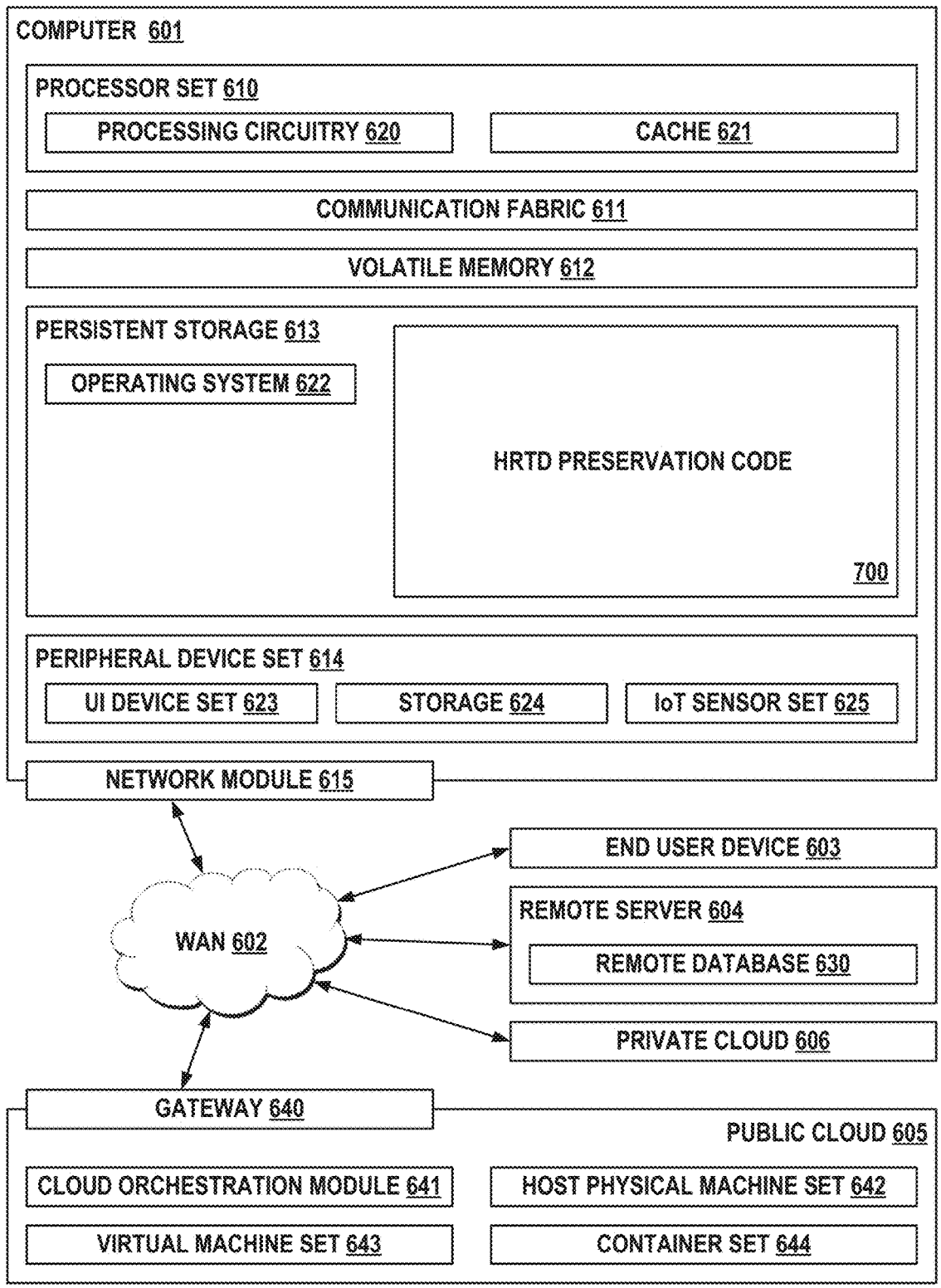
FIG. 6 depicts a computing environment, according to embodiments.

Referring now to FIG. 5, an example method 500 for restoring an HRTD using an EOD overwritten by SAW, according to embodiments. Method 500 is described herein in reference to tape drive 120 in tape storage system 100 of FIG. 1, but it is to be understood that other suitable tape drives and tape storage systems may perform method 500 in other embodiments. Method 500 may be performed in response to the failure of the tape drive to restore the HRTD from sHKDS on loading the tape cartridge and restore the HRTD from EOD because the EOD was not written on tape.

At operation 510, tape drive 120 reads EOD information 136 stored in CM 134 to identify information for locating an EOD overwritten by SAW. This may be the information recorded in operation 260 of FIG. 2. For example, the information may include a beginning LPOS of the overwritten EOD and a tape write pass for the overwritten EOD. At operation 520, tape drive 120 repositions the tape head to a position at the beginning LPOS of the overwritten EOD. At operation 530, tape drive 120 reads the overwritten EOD starting at the beginning LPOS of the overwritten EOD using the tape write pass retrieved in operation 510 to obtain the HRTD.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 600 contains an example of an environment for the execution of at least some of the computer code involved in performing the inventive methods, such as HRTD preservation code 700. In addition to block 700, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 700, as identified above), peripheral device set 614 (including user interface (UI), device set 623, storage 624, and Internet of Things (IOT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 1. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 700 in persistent storage 613.

COMMUNICATION FABRIC 611 is the signal conduction paths that allow the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface type operating systems that employ a kernel. The code included in block 700 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
  writing, at a position next to a last written user data set on a tape, an End of Data Set (EOD) including a High Resolution Tape Directory (HRTD); and
  writing, when appending a new user data set, the new user data set starting from a position next to an end longitudinal position (LPOS) of the EOD to generate an overwritten EOD.

2. The method of claim 1, wherein the EOD has a first data set ID and a first tape write pass value, and wherein the new data set has the first data set ID and a second tape write pass value that is greater than the first tape write pass value.

3. The method of claim 1, further comprising recording, in a cartridge memory, information for locating the overwritten EOD.

4. The method of claim 3, wherein the information comprises a data set ID for the overwritten EOD, a tape write pass value for the EOD, a wrap in which the EOD is recorded, and the beginning LPOS of the overwritten EOD.

5. The method of claim 4, further comprising:
  reading the cartridge memory to obtain the end LPOS of the overwritten EOD;
  repositioning a tape head to a position at the beginning LPOS; and
  reading from the beginning LPOS to restore the HRTD from the overwritten EOD.

6. The method of claim 3, further comprising:
  reading the cartridge memory to obtain the information for locating the overwritten EOD;
  locating the overwritten EOD using the information from the cartridge memory; and
  restoring the HRTD by reading the overwritten EOD.

7. The method of claim 1, further comprising:
  reading a first data set;
  in response to determining that the first data set is an EOD, checking EOD information in cartridge memory; and
  in response to determining that the first data set has been overwritten based on the EOD information in cartridge memory, reading a second data set by incrementing a tape write pass value.

8. A tape drive comprising:
  a memory; and a controller communicatively coupled to the memory, the controller configured to:
  write, at a position next to a last written user data set on a tape, an End of Data Set (EOD) including a High Resolution Tape Directory (HRTD); and
  write, when appending a new user data set, the new user data set starting from a position next to an end longitudinal position (LPOS) of the EOD to generate an overwritten EOD.

9. The tape drive of claim 8, wherein the EOD has a first data set ID and a first tape write pass value, and wherein the new data set has the first data set ID and a second tape write pass value that is greater than the first tape write pass value.

10. The tape drive of claim 8, wherein the controller is further configured to record, in a cartridge memory, information for locating the overwritten EOD.

11. The tape drive of claim 10, wherein the information comprises a data set ID for the overwritten EOD, a tape write pass value for the EOD, a wrap in which the EOD is recorded, and the beginning LPOS of the overwritten EOD.

12. The tape drive of claim 10, wherein the controller is further configured to:
  read the cartridge memory to obtain the information for locating the overwritten EOD;
  locate the overwritten EOD using the information from the cartridge memory; and
  restore the HRTD by reading the overwritten EOD.

13. The tape drive of claim 12, wherein the controller is further configured to:
  read the cartridge memory to obtain the end LPOS of the overwritten EOD;
  reposition a tape head to a position at the beginning LPOS; and
  read from the beginning LPOS to restore the HRTD from the overwritten EOD.

14. The tape drive of claim 8, wherein the controller is further configured to:
  read a first data set;
  in response to determining that the first data set is an EOD, check EOD information in cartridge memory; and
  in response to determining that the first data set has been overwritten based on the EOD information in cartridge memory, read a second data set by incrementing a tape write pass value.

15. A computer program product comprising a computer readable storage medium having code embodied therewith, the code executable by a controller to cause the controller to:
  write, at a position next to a last written user data set on a tape, an End of Data Set (EOD) including a High Resolution Tape Directory (HRTD); and
  write, when appending a new user data set, the new user data set starting from a position next to an end longitudinal position (LPOS) of the EOD to generate an overwritten EOD.

16. The computer program product of claim 15, wherein the EOD has a first data set ID and a first tape write pass value, and wherein the new data set has the first data set ID and a second tape write pass value that is greater than the first tape write pass value.

17. The computer program product of claim 15, wherein the code is further executable by the controller to cause the controller to record, in a cartridge memory, information for locating the overwritten EOD.

18. The computer program product of claim 17, wherein the information comprises a data set ID for the overwritten EOD, a tape write pass value for the EOD, a wrap in which the EOD is recorded, and the beginning LPOS of the overwritten EOD.

19. The computer program product of claim 18, wherein the code is further executable by the controller to cause the controller to:
  read the cartridge memory to obtain the beginning LPOS of the overwritten EOD;
  reposition a tape head to a position at the beginning LPOS; and
  read from the beginning LPOS to restore the HRTD from the overwritten EOD.

20. The computer program product of claim 17, wherein the code is further executable by the controller to cause the controller to:
  read the cartridge memory to obtain the information for locating the overwritten EOD;
  locate the overwritten EOD using the information from the cartridge memory; and
  restore the HRTD by reading the overwritten EOD.

* * * * *